Sept. 28, 1943.     B. P. HAZELTINE ET AL     2,330,282
MANUFACTURE OF CONTINUOUS SHEETS OR WEBS OF PLASTIC MATERIAL
Filed July 31, 1940     2 Sheets-Sheet 1
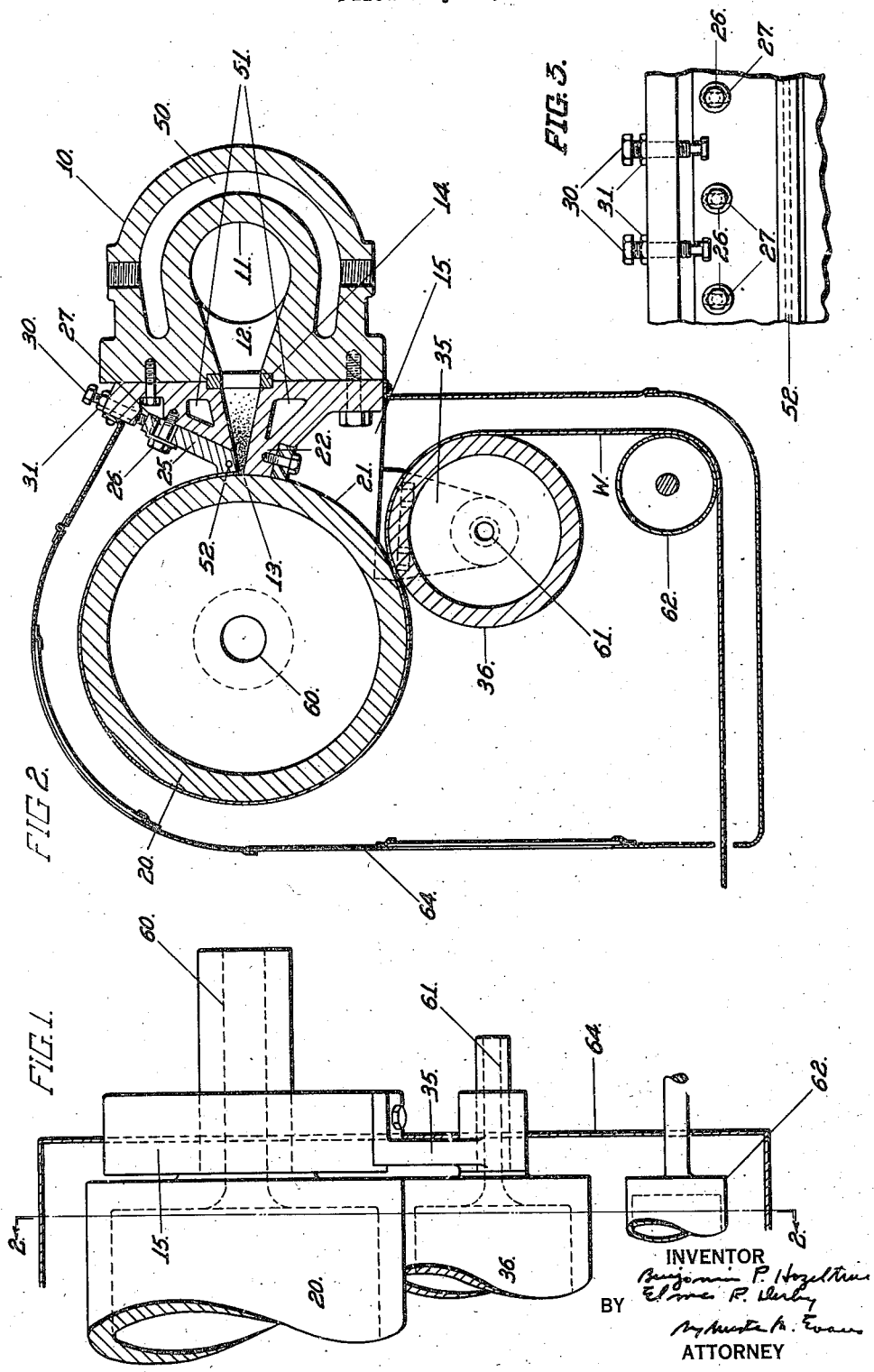
INVENTOR
Benjamin P. Hazeltine
Elmer P. Derby
BY
ATTORNEY

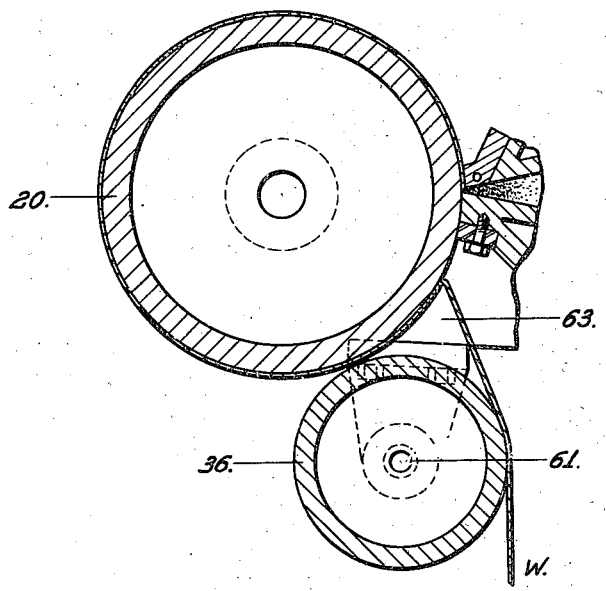
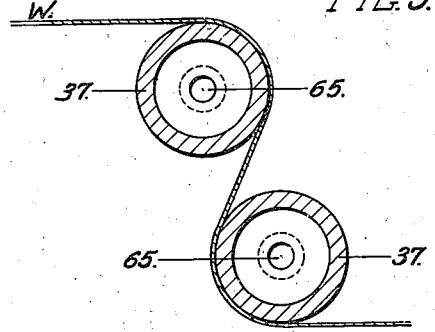

Patented Sept. 28, 1943

2,330,282

UNITED STATES PATENT OFFICE 2,330,282

MANUFACTURE OF CONTINUOUS SHEETS OR WEBS OF PLASTIC MATERIAL

Benjamin P. Hazeltine, Chicopee Falls, and Elmer R. Derby, Springfield, Mass., assignors to Monsanto Chemical Company, St. Louis, Mo., a corporation of Delaware Application July 31, 1940, Serial No. 348,612

12 Claims. (Cl. 18—57)

The present invention relates to the manufacture of tough, continuous sheets, webs or ribbons of high molecular-weight film-forming thermoplastic materials such for example as cellulose esters, cellulose ethers, vinyl esters, vinyl ester co-polymers, polyvinyl acetals, partial polyvinyl acetals and equivalent materials. More particularly, the present invention relates to the manufacture of such sheets or webs having highly polished or other types of surfaces from cellulose esters, as for example, cellulose acetate and cellulose acetate butyrate. Such sheets, webs or ribbons, when manufactured according to one embodiment of the present invention, are highly polished on both sides and are preferably transparent, although not necessarily so, since they may be rendered translucent or opaque by the incorporation of pigments. In the thinner gauges, such sheets, webs or ribbons find use for photographic film, X-ray film, for wrapping articles where transparent highly polished surfaces are desirable, while in the manufacture of containers, boxes and the like, thicker gauges may be employed.

Previously, the casting process has been largely employed for making transparent highly polished continuous sheets or webs from cellulose esters. In the casting process, a relatively dilute solution of the base material in a voltaile solvent is spread on a travelling surface, such as a polished wheel or belt, and retained thereon until sufficient evaporation and seasoning has taken place to set the form of the sheet and permit removal of the formed sheet from the casting surface. Finally, the formed and case-hardened sheet or ribbon is completely dried in a suitable apparatus. This casting process produces transparent polished sheets or films, but is a relatively slow process, and especially for the heavier gauge material involves large solvent losses. Furthermore, it is not commercially practical to manufacture relatively thick films by the casting process. A film having a thickness of .007 inch is about the maximum capable of economic manufacture by the film casting process. Where relatively thick films or ibbons are prepared by casting, it is customary to combine two or more thicknesses into one sheet or film. It is then apparent that the casting process is not only an expensive one, but is also greatly limited in its application.

Another method of making polished sheets of thermoplastic materials is that known as press polishing wherein the unpolished sheet, obtained, as for example, by slicing in a machine resembling a planer from a pressed cake or slab of the thermoplastic material, is interposed between two highly polished metal plates and subjected to high pressures at relatively high temperatures. Such a process is time consuming and expensive. Also, it has been found that irregularities, "sheeter lines" or knife marks were produced in cutting the cake into sheets in the planer and that these were not always permanently removed by press polishing.

In accordance with the present invention it has been found that sheets or ribbons may be produced in a continuous process and wherein both sides of said sheet or ribbon have an exceptionally high polish, or other predetermined surface, and wherein the limitations imposed by the casting and press polishing processes have been eliminated.

One object then of this invention is the formation of sheets or webs of thermoplastic materials, having highly polished or other types of surfaces, and preferably transparent.

Another object is the polishing of continuous webs of unseasoned thermoplastic materials at relatively low temperatures and in the substantial absence of pressure.

Another object of the present invention is the imparting of a surface with desired characteristics to a web of unseasoned plastic materials at relatively low temperatures and in the substantial absence of pressure.

Another object of this invention is the imparting of a surface with desired characteristics to a continuous web of unseasoned thermoplastic materials in the substantial absence of pressure and in the presence of condensed volatile solvent vapors on the surfacing medium.

Other and further objects of this invention and means of their accomplishment will be shown hereinafter.

These objects are accomplished by forming a sheet or ribbon of the base plastic containing a solvent therefor by extrusion through a suitable orifice, giving the desired surface, for example a polish to the unset or non-case-hardened sheet or ribbon, and finally seasoning it. In operating this invention the amount of solvent may vary considerably, but in all cases it is desirable that the amount employed shall be insufficient to produce flow lines during the forming or extruding operation. It is preferred that sufficent solvent be employed so that solvent vapors may condense on the surface of the polishing medium after the forming operation and during the polishing step. Flow lines are minute ridges appearing on the surface of the sheet or web in the direction of extrusion and are due to the use of too great an amount of solvent in the plastic mass during the extrusion step at the body temperature employed.

In certain embodiments of the invention it may be desirable to polish or give the desired surface to one side of the sheet or ribbon after which the other side is polished or given the desired surface, and then the sheet seasoned by suitable means.

In the practice of one embodiment of this invention the plastic mass containing the desired amount of volatile solvent may be extruded into air or onto a travelling support after which the formed web is polished and later seasoned. However, it is frequently preferred to employ an extrusion machine in which an orifice is formed between a die blade and a die roll, this being of the type shown and described in the application of E. R. Derby and F. A. Parkhurst, Serial No. 256,696, filed February 16, 1939, for Method and apparatus for producing sheet material. In this apparatus the sheet or web is formed by being forced against the surface of a highly polished die roll, which is maintained at a temperature below that of the die blade and in consequence chills one side of the stock immediately after it comes in contact with the surface of the roll. Since the mass is maintained in a condition favorable to plastic flow, the surface next to the die roll takes the surface of the die roll. The surface formed by the die blade may have a certain degree of polish, which might be described as an extremely fine mat surface but for certain uses where a high degree of polish and exceptional brilliance is necessary, further polishing is necessary. This additional polishing step may be conveniently effected by passing the side of the sheet formed by the die blade over a cooled highly polished travelling surface, such as that of a cooled moving belt or roll, in such a manner as to insure contact at all points and in a condition favorable to plastic flow, as hereinafter shown.

In some cases it may be found desirable to provide for the addition of further solvent to the surface of the side of the sheet formed by the die blade, either by direct addition of solvent vapors to this surface or to the travelling polishing surface with which it comes in contact or by the suitably enclosing of the polishing surface in a housing to allow the solvent to condense on the cooled surface of the polishing medium.

Where the plastic mass is extruded directly in the air, an apparatus such as that described in U. S. Patent 2,061,042, granted to Frederick A. Parkhurst, November 17, 1936, may be conveniently employed. The unseasoned and unpolished sheet or web is then given the desired surface characteristics and thereafter seasoned or dried. This is conveniently effected by contacting the unseasoned surfaces with travelling surfaces having the desired surface characteristics, as for example, a highly polished belt or roll in such a manner as to insure contact at all points and in a condition favorable to plastic flow, and preferably in the presence of condensed volatile solvent vapors on said belt or roll.

In all cases in the operation of the present invention the unpolished and unseasoned sheet or web must be self-sustaining and in this respect is entirely different from the film as formed by the casting process where the "dope" or plastic solution must be set or case-hardened prior to stripping from the casting surface.

By the term "volatile solvent" as appearing in this application is meant a liquid which has a vapor pressure sufficiently high to allow it to volatilize under seasoning conditions of the stock and which has the property of dissolving the base plastic material.

One form of apparatus which may be conveniently used for our novel method is shown in the accompanying drawings.

Fig. 1 is a front elevational view of an apparatus embodying the invention, partly broken away;

Fig. 2 is a sectional view taken on the line 2—2 of Fig. 1;

Fig. 3 shows diagrammatically means for supporting the die blade; and

Fig. 4 shows an alternate position of the sheet or web on leaving the forming or die roll.

Fig. 5 shows diagrammatically means for giving the desired surface to both sides of a formed but unpolished and unseasoned web of plastic material.

Before explaining in detail the present invention it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The apparatus illustrated in the accompanying drawings comprises a hollow casing 10 having a cylindrical chamber 11 to which plastic material is supplied through one end thereof. The casing 10 is also provided with a passage 12 extending laterally from the passage 11. The walls of the passage 12 taper toward one another and terminate adjacent the surface of a roll 20. If desired a bridge or screen 14 may be interposed in the passage 12.

At each of its ends the casing 10 is provided with a forwardly extending projection 15 in which are formed suitable bearings for rotatably supporting the die roll 20 so that its periphery 21 closely engages the surface of the casing on one side of the passage 12 and prevents any flow of stock along the surface of the roll in this direction. A plate 25, conveniently known as the die blade, forms the end of the opposite wall of the passage in the casing, and with the roll 20 forms the orifice through which the stock is forced to produce the sheet or web. The plate 25 is secured upon the casing by bolts 26 extending through slots 27 in the plate 25 and engaging the casing 10. The position of the plate 25 may be adjusted toward and from the roll 20 and toward and from the wall 22 by screws 30 threaded in the casing 10 and engaging the top edge of the plate 25. The screws 30 may be locked in desired position by lock nuts 31. The space between the die blade 25 and the roll 20 forms the extrusion orifice which is a primary factor in determining the thickness of the web produced.

A roll 36, which is highly polished and functions as a polishing roll, as well as a take-off roll, is rotatably supported in bearings in brackets 35 secured to extensions 15. The periphery of roll 36 is spaced from the periphery of the roll 20 a distance preferably slightly greater than the thickness or gauge of the sheet or web being produced.

The casing 10 is provided with heating means here shown as a water jacket 50 embracing the chamber 11. The casing may also be provided with water jackets 51 extending above and below the passage 12. A water jacket 52 is provided in the plate 25 near the roll 20. The rolls 20 and 36 are hollow and may be supplied with water for controlling their temperature through axial passages 60 and 61 respectively.

Preferably, the rolls 20 and 36 are positively rotated and driven by a source not shown.

Assuming that the plate 25 has been adjusted to the desired position with respect to the roll 20, plastic material containing a relatively small amount of volatile solvent, as compared to that used in the casting process, is supplied to the chamber 11 through one end thereof and thence is extruded through the orifice 13 directly upon the periphery of the roll 20 in the form of a thin unseasoned web W. The web W is moved away from the orifice by the rotation of the roll 20 which being highly polished produces a polish on the contacting surface of the web. The unseasoned web W which is highly polished on the die-roll side and which may have some polish, but insufficient for many uses, on the die blade side is removed from the die roll 20 by means of a highly polished roll 36 provided with cooling means 61 and is led by means of a roll 62 to another point for seasoning or drying. In the operation of this invention, it is desirable, as shown in Fig. 4, that web W forms a loop 63 between the die roll 20 and take-off and polishing roll 36, thus reducing to a minimum any stresses and strains that may result from the direct taking off web W from the die roll as shown in Fig. 2. Furthermore, the passage within the loop 63 allows for solvent vapors to contact more effectively the web W and roll 36 and thus facilitate the polishing step. The rolls 20 and 36 may be suitably enclosed as shown by 64 Fig. 2 so as to maintain the side of the sheet formed by the die blade and the exposed side of roll 36 in an atmosphere of solvent vapors. These solvent vapors tend to facilitate the final polishing of the sheet or web and give it the brilliancy and luster so desirable for materials employed as a transparent packaging media.

If the apparatus shown diagrammatically in Fig. 5 is employed for the polishing step, the plastic material containing volatile solvent may be extruded in an apparatus such as that described in U. S. Patent 2,061,042 referred to above and the opposite sides of the unseasoned and unpolished sheet W passed around rolls 37. These rolls 37, preferably highly polished, although they may have other types of surfaces are rotated in opposite directions and are driven by a source not shown and are hollow and may be supplied with water for controlling their temperature, so as to permit volatile solvent to condense thereon, through axial passages 65. As in Figs. 1 and 2 these rolls are preferably suitably enclosed to facilitate the condensation of the solvent vapors on their surfaces.

The following are given by way of specific embodiments of this invention and are not to be understood as limitative of the scope thereof.

Example 1

| | Parts by weight |
|---|---|
| Cellulose acetate (38.0% acetyl) | 100 |
| Diethyl phthalate | 13.5 |
| Methyl phthalyl ethyl glycollate | 13.5 |
| Acetone | 44.0 |
| Denatured ethyl alcohol | 36.0 |

In forming this mix the cellulose acetate is charged into a jacketed kneading machine heated to 118° F. The solvents and plasticizers are weighed and mixed and added to the cellulose acetate in the mixer while mixing. After about 40 minutes, the direction of rotation of the mixing paddles is reversed for about five minutes to insure that no pockets of incompletely mixed material have been found, after which the mixing paddles are again reversed to normal mixing direction and the mixing continued for another 20 minutes. The temperature of the batch reaches 160° F. after about 40 minutes mixing and is kept at this point throughout the remainder of the mixing cycle by supplying hot or cold water to the mixer jacket as required. In forming this mixture into sheets or ribbons and employing the apparatus disclosed in Figs. 1, 2, 3 and 4, the temperature of the stock just before it contacts the die roll is preferably about 130° F. The temperature of the die roll is about 111° F. and the temperature of the die blade is about 129° F. The pressure back of the die is about 400 pounds per square inch. The temperature of the take-off or polishing roll is about 58° F. By operating in the manner described a transparent sheet or web having a thickness of 0.0075 inch and an exceptionally high polish on both sides is obtained.

By the operation of this invention careful control of the character of the sheet or web can be maintained with the elimination of so-called drag lines and cold lines. Drag lines appear as interrupted lines parallel to the sides of the web and are caused by the plastic or the die blade being maintained at too high a temperature. Cold lines or chevron shaped lines and are caused by the plastic or the die blade being maintained at too low a temperature. For the particular stock given in Example 1 a temperature above 160° F. for the plastic mass and a temperature above 145° F. for the die blade tends to produce drag lines, while a die blade temperature about 10° F. lower than the preferred temperature given above of 129° F. tends to produce cold lines.

As another specific example of the manufacture of transparent highly polished sheets or webs according to this invention, the following mixture was prepared in the manner as indicated in Example 1.

| | Parts by weight |
|---|---|
| Cellulose acetate (37.5% to 38.5% acetyl) | 100 |
| Diethyl phthalate | 13.5 |
| Methyl phthalyl ethyl glycollate | 13.5 |
| Toluol | 31.8 |
| Denatured ethyl alcohol | 28.2 |
| Acetone | 20.0 |

The mixture so prepared was formed into a sheet or web in the manner indicated in Example 1. In this case the temperature of the stock before contacting the die roll is about 160° F. The temperature of the die-roll is about 140° F. and the temperature of the die blade is about 156° F. The pressure back of the die is about 356 pounds per square inch. The temperature of the take-off or polishing roll was 60° F. A transparent web having a thickness of 0.0075 inch was so produced having exceptionally highly polished surfaces.

Example 3

Another formulation which, when employed according to this invention, produces transparent sheets or webs having both sides highly polished comprises

| | Parts by weight |
|---|---|
| Cellulose acetate (37.5 to 38.5% acetyl) | 100 |
| Methyl phthalyl ethyl glycollate | 12 |
| Diethyl phthalate | 12 |
| Acetone | 15 |
| Denatured ethyl alcohol | 24 |
| Ethyl acetate | 24 |

Furthermore, while cellulose acetate has been specifically shown to illustrate the invention, other thermoplastic materials may be formed into sheets or webs, preferably by extrusion, the unseasoned sheet or web given the desired surface and the sheet or web so obtained seasoned or dried in a convenient manner. As further illustrations of this invention are given transparent highly polished sheets or webs prepared in the manner described above, employing cellulose acetate butyrate, cellulose propionate, ethyl cellulose, polymerized vinyl esters, co-polymers of vinyl chloride and vinyl esters of the lower aliphatic acids, for example, vinyl acetate, polyvinyl acetals, partial polyvinyl acetals, for example, a partial polyvinyl acetal made from butyraldehyde and containing approximately 18–20% hydroxyl groups calculated as polyvinyl alcohol, 1–2% polyvinyl acetate and the balance substantially acetal, and a partial polyvinyl acetal made from formaldehyde and containing approximately 8% hydroxyl groups calculated as polyvinyl alcohol, 10% polyvinyl acetate and the balance substantially acetal.

The present invention is limited solely by the claims appended hereto as a part of this invention.

What is claimed is:

1. In a continuous process of making a web of thermoplastic material having polished surfaces, which includes the steps of continuously extruding a volatile-solvent-containing thermoplastic material in a plastic condition into the form of a continuously moving web and continuously polishing the surfaces of said moving web, the improvement for imparting a polish to both surfaces of said moving web which comprises evaporating a portion of the solvent from said web, then condensing a portion of the evaporated solvent on a pair of polishing means, pressing one surface of said moving web against one of said polishing means and then pressing the other surface of said moving web against the other polishing means.

2. In a continuous process as defined in claim 1 in which said thermoplastic material comprises cellulose acetate and a volatile solvent.

3. In a continuous process of making a web of thermoplastic material having polished surfaces, which includes the steps of continuously extruding thermoplastic material in plastic condition into the form of a continuously moving web and continuously polishing the surfaces of said moving web, the improvement for imparting a polish to the surfaces of said moving web which comprises pressing one surface of said web against a polishing means, and then applying solvent to and pressing the other surface of said web against another polishing means.

4. In a continuous process of making a web of thermoplastic material having polished surfaces, which includes the steps of continuously extruding thermoplastic material in plastic condition into the form of a continuously moving web and continuously polishing the surfaces of said moving web, the improvement for imparting a polish to the surfaces of said moving web which comprises pressing one surface of said web against a polishing means, in the absence of any substantial pressure applied to the other surface of said web, and then applying solvent to and pressing the other surface of said web against another polishing means, in the absence of any substantial pressure applied to the first-mentioned surface of said web.

5. In a continuous process of making a web of thermoplastic material having polished surfaces, which includes the steps of continuously extruding thermoplastic material in plastic condition into the form of a continuously moving web and continuously polishing the surfaces of said moving web, the improvement for imparting a polish to the surfaces of said moving web which comprises applying solvent to and pressing one surface of said web against a polishing means, in the absence of any substantial pressure applied to the other surface of said web, and then applying solvent to and pressing the other surface of said web against another polishing means, in the absence of any substantial pressure applied to the first-mentioned surface of said web.

6. In a continuous process of making a web of thermoplastic material having polished surfaces, which includes the steps of continuously extruding thermoplastic material in plastic condition, between a die blade and a die roll having a polished surface, into the form of a continuously moving web and continuously polishing the surface of said moving web, the improvement for polishing the surfaces of said moving web which comprises passing said web around a portion of said die roll while one surface of said web is pressed against the polished surface of said die roll, and then applying volatile solvent to the other surface of said web and passing said web around a portion of a second roll having a polished surface and thereby pressing said solvent treated surface against the polished surface of said second roll.

7. In a continuous process as defined in claim 3 in which said web has volatile solvent mixed therewith.

8. In a continuous process as defined in claim 6 in which said web has volatile solvent mixed therewith.

9. In a continuous process of making a web of thermoplastic material having polished surfaces, which includes the steps of continuously extruding thermoplastic material in plastic condition between a die blade and a die roll having a polished surface into the form of a continuously moving web and continuously polishing the surface of said moving web, the improvement for polishing the surfaces of said moving web which comprises passing said web around a portion of said die roll while one surface of said web is pressed against the polished surface of said die roll and then passing said web around a portion of a second roll having a polished surface with solvent thereon and with the other surface of said web in contact with said polished surface, thereby pressing said other surface of said web against the solvent-covered polished surface of said second roll.

10. In a continuous process as defined in claim 9 in which said thermoplastic material has volatile solvent mixed therewith, a portion of which leaves said web as it is passed around said die roll, and in which a portion of said solvent is condensed on the polished surface of said second roll.

11. In a continuous process as defined in claim 9 in which said thermoplastic material has volatile solvent mixed therewith, a portion of which leaves said web as it is passed around said die roll, and in which said web is removed from said die roll to said second roll at such a point with respect to said die roll and said second roll that a substantially enclosed space is formed by a portion of said web in contact with said die roll, a portion of said web passing from the point of removal from said die roll to the point of contact with said second roll, and a portion of the surface of said second roll, and in which a portion of the volatile solvent leaving said web enters said confined space and is condensed therefrom on the surface of said second roll.

12. In a continuous process as defined in claim 9 in which said thermoplastic material comprises cellulose acetate.

BENJAMIN P. HAZELTINE.
ELMER R. DERBY.